(12) United States Patent
Bourgoin et al.

(10) Patent No.: US 9,113,720 B2
(45) Date of Patent: Aug. 25, 2015

(54) INFANT SEAT COVER

(71) Applicants: Nathalie Bourgoin, St-Bruno (CA); Murielle Charbonneau, Longueuil (CA)

(72) Inventors: Nathalie Bourgoin, St-Bruno (CA); Murielle Charbonneau, Longueuil (CA)

(*) Notice: Subject to any disclaimer, the term of this patent is extended or adjusted under 35 U.S.C. 154(b) by 97 days.

(21) Appl. No.: 13/775,911

(22) Filed: Feb. 25, 2013

(65) Prior Publication Data
US 2014/0239681 A1 Aug. 28, 2014

(51) Int. Cl.
A47C 7/62 (2006.01)
A47D 15/00 (2006.01)
A47D 13/02 (2006.01)

(52) U.S. Cl.
CPC ............... A47D 15/00 (2013.01); A47D 13/02 (2013.01); A47D 13/025 (2013.01)

(58) Field of Classification Search
CPC ..... A47D 15/00; A47D 13/02; A47D 13/025; A47C 7/66; B60N 2/28; B60N 2/6009
USPC ............. 297/184.13, 184.14, 184.15, 219.12, 297/224, 228.12, 228.13
See application file for complete search history.

(56) References Cited

U.S. PATENT DOCUMENTS

| | | | | |
|---|---|---|---|---|
| 1,289,965 A * | 12/1918 | Tichenor | ................ | 296/107.02 |
| 2,888,009 A * | 5/1959 | Taylor | ........................ | 128/873 |
| 3,193,322 A * | 7/1965 | Hines | .......................... | 296/102 |
| D267,284 S * | 12/1982 | Andrews | ...................... | D2/719 |
| 4,946,221 A * | 8/1990 | Livingston | ............... | 297/184.13 |
| 5,301,999 A * | 4/1994 | Thompson et al. | ....... | 297/184.13 |
| 5,309,586 A * | 5/1994 | Sies et al. | ........................ | 5/482 |
| 5,437,061 A * | 8/1995 | Kenner | ............................. | 2/69 |
| 5,549,354 A * | 8/1996 | Rosen | ...................... | 297/184.13 |
| 5,956,767 A * | 9/1999 | Imm | ................................ | 2/69.5 |
| 5,957,537 A * | 9/1999 | Hoolahan | ...................... | 297/464 |
| 6,019,421 A * | 2/2000 | Roh | ......................... | 297/184.13 |
| 6,039,393 A * | 3/2000 | Roh | ......................... | 297/184.13 |
| 6,055,686 A * | 5/2000 | Knight | ............................ | 5/494 |
| 6,056,355 A * | 5/2000 | Klassen | ..................... | 297/184.13 |
| 6,068,322 A * | 5/2000 | Kuester | ........................ | 296/97.21 |
| 6,145,932 A * | 11/2000 | Hamel-Nyhus et al. | ...... | 297/465 |
| 6,209,953 B1 | 4/2001 | Mackey et al. | | |
| 6,272,683 B1 * | 8/2001 | Symms et al. | ................. | 2/69.5 |
| 6,296,307 B1 * | 10/2001 | Holtke | ...................... | 297/219.12 |
| 6,394,543 B1 | 5/2002 | Dunne et al. | | |
| 6,481,791 B1 * | 11/2002 | Facchini et al. | .......... | 297/184.13 |
| 6,547,325 B2 * | 4/2003 | Drost et al. | ............... | 297/184.13 |
| 6,702,374 B2 * | 3/2004 | Kams | ....................... | 297/184.13 |
| 6,749,258 B1 * | 6/2004 | Leikin | ...................... | 297/219.12 |
| 6,764,134 B1 * | 7/2004 | Crescenzi et al. | ........ | 297/219.12 |
| 7,100,982 B2 * | 9/2006 | Lundgren | ................ | 297/256.17 |

(Continued)

*Primary Examiner* — Milton Nelson, Jr.
(74) *Attorney, Agent, or Firm* — Robert Brouillette; Brouillette & Partners

(57) ABSTRACT

A protecting cover for an infant seat is disclosed. The seat cover overlays an infant seat and downwardly extends along the sides of the infant seat. The seat cover comprises an elasticized or drawstring bottom hem in order to be secured in place. The cover comprises an opening acting as a chimney allowing air circulation. The opening is generally located on the top portion of the seat cover, substantially over the position of the infant head. The infant seat cover comprises a pair of recloseable body flaps located between the periphery of the opening and the bottom of the infant seat. The cover fits over the upper perimeter of the infant seat and substantially covers the infant. The cover is designed with a multilayer semi rigid insulating material able to maintain its shape and not interfere with the infant's movements.

22 Claims, 2 Drawing Sheets

(56) References Cited

U.S. PATENT DOCUMENTS

| | | | |
|---|---|---|---|
| 7,150,499 B2 * | 12/2006 | McGregor | 297/184.13 |
| 7,284,790 B1 * | 10/2007 | Brewer | 297/184.13 |
| D559,022 S * | 1/2008 | Morales Cabello | D6/500 |
| 7,341,011 B2 * | 3/2008 | Pines et al. | 112/475.08 |
| 7,384,098 B1 * | 6/2008 | Allwin | 297/219.12 |
| D597,732 S * | 8/2009 | O'Brien et al. | D2/719 |
| 7,695,066 B2 * | 4/2010 | Guercia et al. | 297/228.11 |
| 8,287,038 B2 * | 10/2012 | Henderson | 297/184.17 |
| D676,220 S * | 2/2013 | Bostajian | D2/719 |
| 8,550,548 B2 * | 10/2013 | Gibbons et al. | 297/184.13 |
| 2002/0125747 A1 * | 9/2002 | Drost et al. | 297/184.13 |
| 2004/0026965 A1 * | 2/2004 | Haney | 297/184.13 |
| 2004/0245819 A1 * | 12/2004 | Bugher | 297/219.12 |
| 2006/0174410 A1 * | 8/2006 | Mastandrea, Jr. | 5/482 |
| 2007/0085391 A1 * | 4/2007 | Pines et al. | 297/219.12 |
| 2008/0001451 A1 * | 1/2008 | Olson | 297/219.12 |
| 2008/0079297 A1 * | 4/2008 | Braxton Perry | 297/219.12 |
| 2008/0277981 A1 * | 11/2008 | Sizemore | 297/219.12 |
| 2010/0038939 A1 * | 2/2010 | Kim | 297/184.13 |
| 2010/0072793 A1 * | 3/2010 | Kress | 297/184.13 |
| 2011/0049950 A1 * | 3/2011 | Pereira | 297/219.12 |
| 2011/0101742 A1 * | 5/2011 | Hei et al. | 297/184.13 |
| 2011/0148159 A1 * | 6/2011 | Barron et al. | 297/219.12 |
| 2012/0187732 A1 * | 7/2012 | Lerm | 297/219.12 |
| 2012/0256452 A1 * | 10/2012 | Berry | 297/184.13 |
| 2013/0057032 A1 * | 3/2013 | Turnage et al. | 297/184.13 |
| 2013/0292973 A1 * | 11/2013 | Loaiza | 297/184.12 |
| 2014/0021751 A1 * | 1/2014 | Lang et al. | 297/184.13 |

* cited by examiner

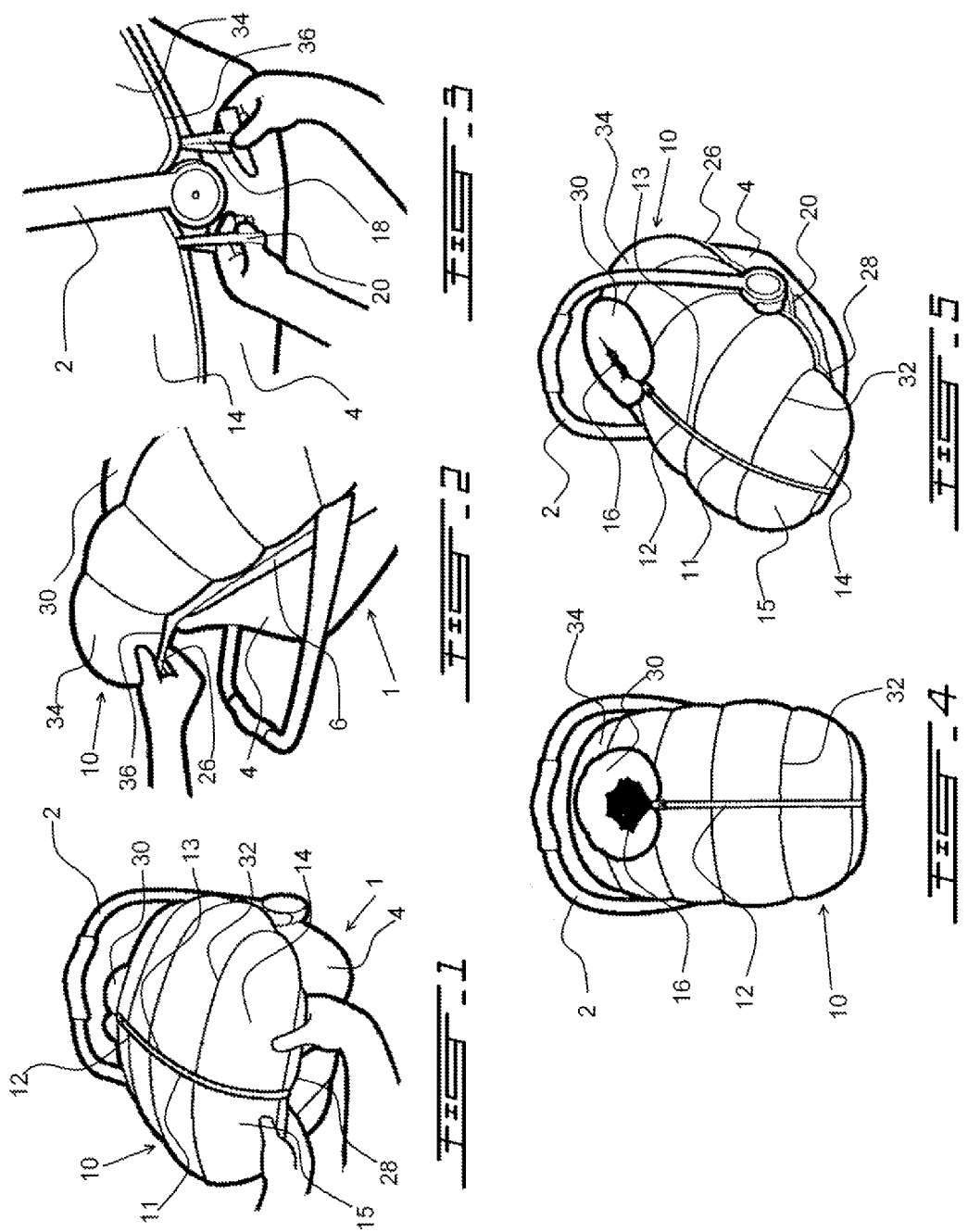

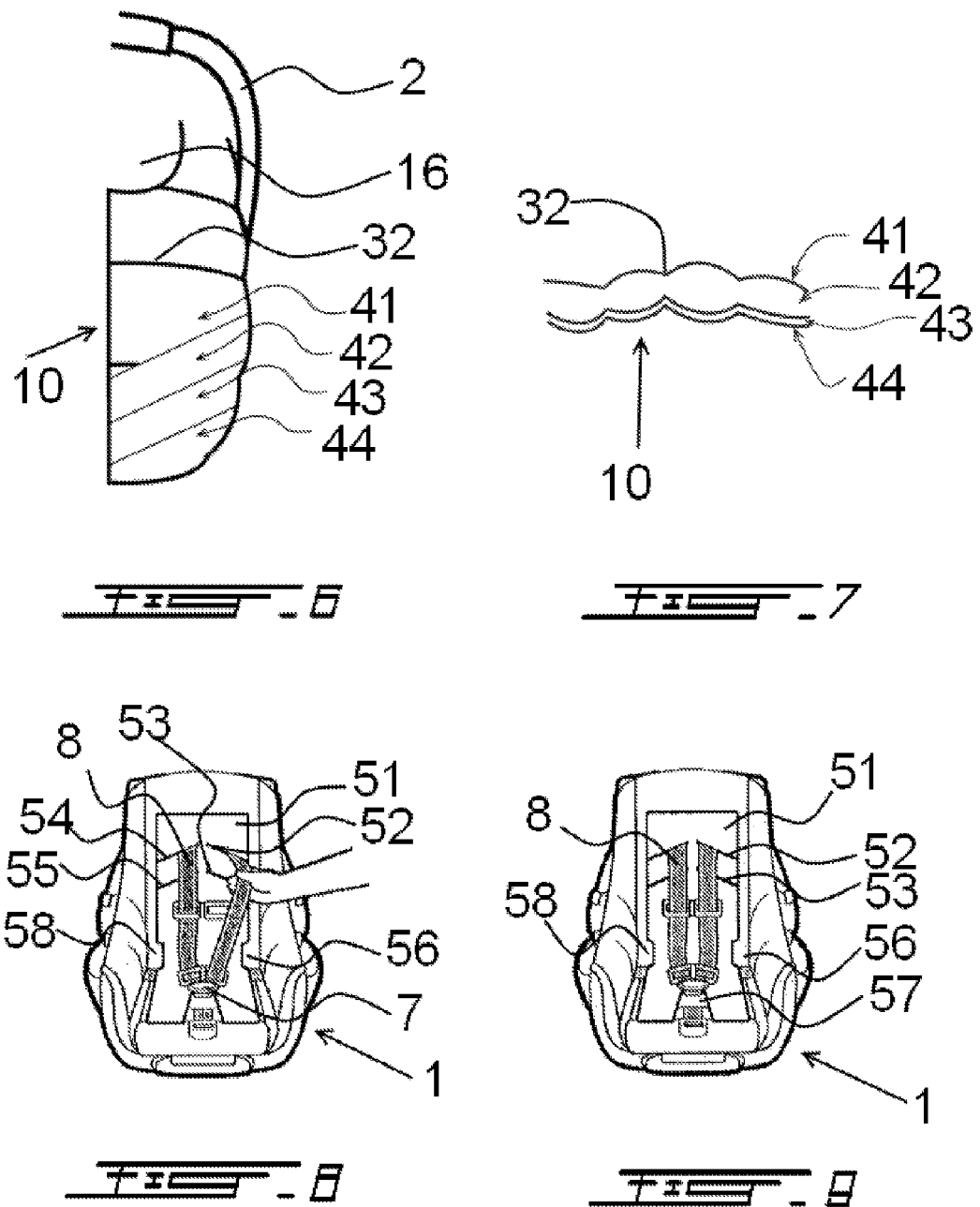

INFANT SEAT COVER

FIELD OF THE INVENTION

The present invention generally relates to seat covers and more particularly pertains to infant seat covers for protecting an infant from the elements of the environment.

BACKGROUND OF THE INVENTION

Young children are especially sensitive to temperature variations as a result of their insufficiently developed hypothalamic temperature regulation mechanisms and their relatively high skin surface area to body mass ratio. Thus, it is generally advisable to wrap such small children in blankets or the like even at temperatures which most adults would perceive to be pleasantly cool. However, this solution may present problems when young children are seated in stationary seating devices or are conveyed in portable seating devices such as infant carriers, strollers, car seats, or the like.

The use of separate blankets with such seating devices is often cumbersome as it requires the tucking of the extremities of such blankets into insufficient spaces beneath or next to the child. Typically, this configuration creates gaps which allow cold air to reach the infant. In addition, comfort of the infant is often an issue as the presence of the tucked-in blanket is often uncomfortable for the infant. Furthermore, when the blanket is not tucked-in or is not adequately held in place, it may easily be kicked off by the child or may be caught in the wheels of a stroller or the like.

As a result, infant seat covers have been developed in attempt to address these problems. Two such covers are disclosed in U.S. Pat. No. 4,946,221 ('221), and U.S. Pat. No. 5,309,586 ('586). However, the latter, '586, discloses a cover covering the full surface of the infant seat. As a result, the cover must be removed when the infant is out of the elements (e.g., buckled into the car seat).

The former invention, '221, has an opening which allows the infant to easily breathe and see. Furthermore, the opening allows the infant to be watched. The cover disclosed in '221 provides a quick installation/removal process in order to minimize the chances of disturbing the infant. Although the prior system may be satisfactory in some cool temperatures, as soon as the temperature becomes harsher, there is still a need to have the infant wear a winter suit, which is generally not practical.

Additionally, some prior art coverings consist of blankets that are simply provided with holes that receive the straps of a seating device such as a car seat. However, such coverings are not fitted to the seating device as they do not attach thereto, and are thus cumbersome to install. Furthermore, the position of the blankets is likely to change as the infant moves within the seating device or as the infant grows. Thus, there is a need to cover an infant's seating devices which allows easy access to infants seated therein and yet is comfortable to the infant. Desirably, the covering should be readily attachable to the infant's seat while also be designed to provide proper insulation to the infant regardless of temperatures.

SUMMARY OF THE INVENTION

The aforesaid and other objectives of the present invention are realized by generally providing a removable cover for use with an infant seat, such as a car seat, having an upwardly open rigid frame within which an infant reclines facing outwardly. The cover includes a body, typically made from water-repellent material.

Typically, the clothes wore by infant highly depend on the temperature level, ranging from a light sleeper up for warmer temperatures to a bunting or snowsuit for freezing temperatures. However, as the body mass of infant is generally lower than an adult person and as the infants are (usually) unable to communicate, a parent or guardian must ensure that the infant is neither too cold nor too warm by properly dressing the infant and covering him with additional covers or blankets.

This gives rise to several difficulties, especially when the infant is to be transported from one place to another, usually in the rear seat of an automobile as mandated by law or sometimes by being in an infant car seat which is placed into a wheeled frame so as to function as a stroller. Especially when an infant is to be carried from the home to a remote location via automobile, the infant may be carried from a warm environment to a cool or cold environment (from inside to outside) and then to a cool environment (the backseat of an automobile) and afterwards to a prospectively warm environment (such as a shopping mall, or to visit friends or relatives, the doctor, and so on). In many such instances, it is convenient for the parent or guardian not to carry the infant car seat from say, the home to the automobile, or from the automobile to the place being visited, as the infant can be carried in the arms, a sling or front papoose, and so on.

The present invention results from the realization that a useful removable protective cover for an infant seat or carrier may be accomplished by having a rigid body configured to remain at a distance from the infant body to allow the infant to move freely and not to suffocate. As such, this new infant seat cover is generally made from a combination of insulating materials allowing the cover to act as a generally semi rigid cover for the infant seat.

Furthermore, the invention increases the security level of the carried infant as the securing means of the infant seat are directly installed on the child instead of being installed over an isolation layer, such as a winter suit or a blanket, wore by the infant. In this configuration, the tension of the securing mean is increased as no fluffy isolation layer is compressed against the child. As a result, the infant is directly secured to the infant seat, protecting the infant against ejection from the infant seat in case of accident.

In addition, the protecting outer cover comprises a protective domelike configuration so that it may be placed over the top of an infant seat and so as to extend downwardly at a bottom edge of the cover so as to overlie at least a portion of the sides of an infant car seat when in place thereon.

The cover typically has an opening formed therein, in a region where the face of an infant would be located when an infant is placed in an infant seat and the cover is in place on the infant seat.

The cover also comprises a pair of recloseable body flaps formed in the region thereof which is below the opening for the face. Each body flap has an edge which extends from the opening to the foot of the infant seat when the cover is in place on the seat.

The body flap edges are arranged so as to be at least adjacent to each other when the body flaps are closed so as to provide coverage of the infant seat and the body of an infant therein when the recloseable body flaps are closed and the cover is in place on an infant seat.

When the pair of body flaps is opened, the infant can be placed into or removed from the seat without having to take the outer cover off the seat; and the cover may be placed over the seat even when the seat is secured in place on a support. The cover generally fits over the upper perimeter of the infant seat, to substantially cover the infant. The cover is configured to keep its shape and not enter in contact with the infant. As such it is keeping the infant insulated from the outside element.

The self sustained shape memory structure of the cover allows the infant to move freely event if the seat cover is installed on the infant seat. Any discomfort usually experienced by having the seat cover in contact with and preventing the liberty of movement and respiration of the infant is thus greatly reduced. In addition, the special composition of the cover's double insulation layers allows the infant to remain in light clothing, thus substantially reducing the need for the infant to wear cumbersome winter suit. As such, the use of the present invention allows the parent to transport the infant during winter without the requirement of having the infant wearing substantially warm clothing.

Another aspect of the present invention may be found in the overall igloo like structure. The igloo structure keeps an infant warm and allows air to circulate underneath the seat cover. The igloo like structure of the present invention departs from several prior art covers wherein they attempt to cover the infant face with a flap in order to have the infant remain warm. The present invention is achieving the same objective without requiring covering the infant's face. It is widely known that most parents do not want a product designed in a way that requires covering the infant's face in order to keep the infant warm. Several parents are afraid of having the infant suffocating underneath a cover. Accordingly, the reinforcement element may be substantially inserted within the stitching thereby maintaining a central portion of the cover above the surface defined by the seat edge.

Although several prior art cover are shown having an opening for the infant's face, the lack of structure of the cover prevent prior art cover from having the same igloo effect.

The multilayer insulating material comprises a first layer made from water-repellent fabric such as treated nylon or polyester, a second layer made from a polyester having a thickness ranging from $3/8$ to $7/8$ inch. The third layer, a high performance insulating polyester, is designed to keep the infant warm by preventing cold air from reaching the infant inside the covered seat. The fourth layer is typically a soft fabric such as polar (micro-fleece 100% polyester). The fourth layer allows an infant to feel comfortable while seated underneath the seat cover. The multilayer defined by the seat edge.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which:

FIG. 1 is front view an infant seat cover according to the present invention.

FIG. 2 is side view of the infant seat cover of FIG. 1.

FIG. 3 is close up side view of the infant seat cover of FIG. 1 showing the mechanism used to secure the infant seat cover onto the infant seat.

FIG. 4 is a top view of an infant seat cover seat in accordance with the present invention.

FIG. 5 is a front side perspective view of an infant seat cover seat in accordance with the present invention.

FIG. 6 is top view of the infant seat cover seat in accordance with the present invention, wherein different layers of the cover are shown.

FIG. 7 is a cross sectional view of an infant seat cover seat in accordance with the present invention showing the two insulation layers.

FIG. 8 is top view of an infant seat in accordance with the present invention shown during the installation of the underneath layer.

FIG. 9 is top view of the infant seat in accordance with the present invention having an underneath layer installed.

DETAILED DESCRIPTION OF THE PREFERRED EMBODIMENT

A novel infant seat/carrier cover will be described hereinafter. Although the invention is described in terms of specific illustrative embodiments, it is to be understood that the embodiments described herein are by way of example only and that the scope of the invention is not intended to be limited thereby.

Now referring to FIGS. 1 and 5, an infant seat cover 10 mounted onto an infant carrier seat 1 is shown. The seat cover 10 comprises a top portion 34 substantially covering the carrier 1, wherein the top portion comprises an opening 16 (See FIG. 4) and at least two flaps 14 and 15, a downward portion comprising an edge 26 and 28 located on the outer portion of the cover and typically made with expandable and collapsible material. The seat cover 10 may further comprise securing mechanism or means 18 and 20 to secure the seat cover 10 to the carrier.

Now referring to FIGS. 1 and 2, an infant seat 1 typically comprises a rim 6 circling around the seating area, a base 4 and a carrying handle 2. The bottom edge 28 of the outer portion of the cover 10 must be pulled over the rim 6 when installing the cover 10 on the infant seat 1. The portion of the infant seat cover 10 circling the rim 6 should preferably be made with collapsible and extendable material in order to allow easy installation and removal of the seat cover 10 over the carrier seat 1. One skilled in the art shall appreciate that the ease of installation and removal allows, for instance, the cleaning of the seat cover 10, the replacement with another child protecting cover 10 due to seasonal changes or variation of the weather or temperature.

Still referring to FIGS. 1 and 2, the seat cover 10 is generally configured as a dome or an elongated dome. The dome configuration allows the seat cover 10 to be placed over an infant seat 1 and avoids the collapsing of the seat cover 10 on the seated infant. The dome appearance further allows the bottom edges 28 to downwardly extend over the rim 6 and to overlie at least a portion of the sides 4 of the infant seat 1 when the seat cover is installed.

Still referring to FIG. 1, the seat cover 10 comprises a pair of recloseable body flaps 14 and 15 formed within the cover top portion 34. Each body flaps 14 and 15 comprises an edge 12 or 13, typically extending from the opening 16 to the lower edge 28 of the seat cover 10.

Each body flap edges 12 and 13 comprises a locking mechanism, such as, but not limited to, a fastener, a zipper, at least one hook, a plurality of loop fasteners, dome fasteners, snap fasteners, buttons or Velcro™, allowing each body flap 14 and 15 to be attached to the other, thus providing a protection barrier for the infant against the elements of the external environment. Typically, the body flaps 14 and 15 may be opened by unlocking the body flap edges 12 and 13, thus, allowing the seated infant to be pulled out of the seat or simply allowing the seated infant to be accessed.

Now referring to FIGS. 1 and 2, the top 26 and bottom 28 edges of the infant seat cover 10 are generally installed over the infant seat rim 6. In a preferred embodiment, the edges 26 and 28 comprises an expandable and collapsible member, typically made with elastic material, thus, securing the cover 10 to the frame 4 when installed. The edges may further comprise any other fastening mechanism (not shown) to attach the seat cover 10 to the infant carrier 1, which is closed by stitching 36. In other embodiments, other fastening means may be contemplated. As an example, the edges 26 and 28 may comprise a Velcro attachment which may be secured (removably fixed) to a compatible Velcro located on the carrier 1. Furthermore, the seat cover 10 may be wrapped around the seat or carrier 1 and be attached to itself or to the seat 1 by fastening mechanism.

In another embodiment, the infant seat cover of FIG. 1 may further comprise additional securing mechanisms enabling the secure fixation of the cover 10 to the infant seat 1. Now referring to FIG. 3, a securing means for securing the cover 10 to the infant seat 1 is shown. The securing mechanism for retaining the cover 10 generally comprise two parts 18 and 20 which are interconnected over the base seat handle 8. In order to secure the seat cover 10 to the carrier 1, the male portion 18 of the securing mean must be installed through the female portion 20 of the securing mean. In some jurisdiction, such additional securing mechanisms may be required by law. Even if the seat cover 10 is well secured to the carrier 1 using an elastic edge 26 or 28 configured to cover the infant seat rim 6, the additional securing means allows a generally stronger and more uniform installation of the cover 10 onto the infant seat 1.

In other embodiments, the securing mechanism may be selected from a group consisting of elasticized hem, drawstring hem, at least a pair of ties adapted to extend under an infant car seat, at least a pair of elasticized loops adapted to extend under an infant car seat, and/or a combination thereof.

As best shown in FIG. 4, the opening 16 is formed therein on the top portion and generally located over the normal position of the seated infant when the cover 10 is installed on the infant seat 1. The opening 16 allows air to circulate within the infant seat 1. The domelike structure of the cover 10 combined to the opening 16 allow the cover 10 to benefit from an igloo like effect wherein the warmth is generally kept inside the infant seat while still allowing for some air circulation thereby preventing the infant from suffocating from oxygen depleted air. Furthermore, for embodiments used in freezing temperature, the opening 16 periphery 30 may be made with insulation material preventing too much air to circulate outside of the seat cover 10.

Now referring to FIGS. 6 and 7, the seat cover 10 comprises multiple layers of material. In a preferred embodiment, the seat cover comprises four layers of material maintaining a domelike configuration. The first layer 41 is typically made from weather resistant material to protect the infant from diverse environmental elements, such as wind, rain, snow or dust. The second layer 42 is typically made from a material having a shape memory, such as foam. Such shape memory material preserves the domelike shape of the seat cover 10. The third layer 43 is made with a high performance insulating material increasing the weather resistance and keeping the internal temperature warm. The fourth layer 44 is made from a soft fabric for the infant to feel comfortable upon any interaction with the cover. The multiple insulation layers are held together with any stitching 32 further reinforcing the domelike structure.

In a preferred embodiment, any insulating material used shall be fireproof, flame-proof and/or non-flammable in order to conform to local transportation authorities. Typically, an insulation layer will be stuffed with insulation fabric, such as fiber fills insulation fabric, such as, but not limited to Powderfill™ from Matador Converters Co Ltd. In other embodiment, the insulating material may chosen from a group consisting of polyester, cotton, quilted cotton, flannel, quilted flannel, nylon, quilted nylon, synthetic fabrics, wool, foam and combination thereof.

Still referring to FIGS. 6-7, an exemplary embodiment of the multilayer insulating material is shown. The multilayer insulating material comprises a first layer 41 made from water-repellent nylon preferably having breathable properties, a second layer 42 made with semi-rigid insulating polyester fibres having a thickness ranging from ⅜ to ⅞ inch maintaining the domelike structure of the cover upon installation onto the infant seat, a third layer 43 made with high performance insulating polyester fabric, wherein the third layer is designed to keep cold air outside of the seat cover 10, thus away from the infant. The third layer is a stuffing layer maintaining the insulation of the infant while the cover is installed onto the infant seat. The multilayer insulating material further comprises a fourth layer 44 typically made with soft fabric. In the exemplary embodiment, the soft fabric used is micro-fleece polyester, preferably treated anti-pill micro-fleece.

In a preferred embodiment, the cover 10 comprises a self sustaining structure allowing the cover to provide the infant with an igloo like insulation effect. The igloo effect allows the infant to remain warm despite being subjected to the elements. Although the cover 10 substantially covers the infant seat, the opening 16 still permits air circulation underneath the cover without significant heat loss.

Now referring to FIGS. 8 and 9, another embodiment presenting the infant seat cover used with an under layer 51 fitting the infant seat 1 configuration is shown. The under layer 51 may comprise more than one opening 52, 53, 54 and 55, allowing the safety belts 8 of the infant seat 1 to be inserted. Also, the under layer 51 comprises notches 56, 57 and 58 allowing a better fit to the infant's car seat 1. The under layer 51 is generally made from flexible material permitting the under layer 51 to mould into the infant car seat 1. Typically, the under layer is made with soft fabric, such as polar fabric.

In another embodiment, the under layer 51 may combine an insulating layer and the soft fabric. The insulating layer is generally substantially recovered with the soft fabric, thus increasing the comfort of the seated infant.

Furthermore, the under layer 51 is designed to be installed on the infant seat 1. Typically, the under layer 51 is fitted underneath the infant and may be removable. Other embodiments may comprise an under layer 51 fixed to the infant carrier 1. The under layer 51 adds to the comfort of the infant allowing him to remain warm despite the cold temperatures.

In another embodiment, the under layer 51 may further comprise side linings (not shown) to cover the lateral portions of the infant seat 1. An under layer 51 comprising side linings increases the insulation provided by the seat cover 10 by keeping the infant back warm. The side linings of the under layer 51 typically extends up to or below the rim 6 of the infant seat structure 4. Preferably, the side lining of the under layer 51 shall substantially mould to the inside of the infant seat, thereby providing improved insulation.

In another further embodiment, an infant seat cover 10 equipped with an under layer configured to be installed into the infant seat 1, underneath the infant. In the further embodiment, the under layer is made with insulating hypoallergenic high density laced polyester fibre. The polyester is typically washable and in compliance with most international regulations relating to heat retention. The polyester material may further be substantially recovered with micro-fleece polyester. Additionally, the micro-fleece polyester may be treated with anti-pill solution.

In another further embodiment, the infant seat cover 10 is configured for mild inter-season temperatures. A seat cover 10 for inter-season temperatures require reduced insulation compared to an embodiment configured for subzero temperatures. Accordingly, the top portion 34 of the seat cover 10 comprises multiple layers insulation wherein the second layer 42 is made from a material having a shape memory thinner than the second layer 42 of the subzero temperature embodiments. The thickness of the second layer generally varies according to the desired insulation rate required by the infant seat cover 10. As a thinner shape memory fabric reduces the structural properties of the second layer allowing to retain a domelike shape at least one additional structural reinforcement element may be required. Typically, the structural reinforcement are embodied as rod, spindle, plastic lath or camber inducers. The structural reinforcement elements create a domelike shape without requiring as much foam insulation. Typically, the at least one structural reinforcement element is inserted and held in the stitching 32. Furthermore, the first, third and fourth layer, if present, may be made with material having different properties from the layers of the subzero embodiment, such as being more breathable or providing a lower insulating ratio.

In another further embodiment, the infant seat cover 10 is configured to be used in hot temperatures. In this embodiment, the infant seat cover 10 does not comprise an opening 16. Instead, the cover entirely covers the infant seat 1 and is made with a single layer, typically tightly woven polyester or nylon. Typically, the cover is made with breathable material such as a screen like fabric or high performance breathable layers. This configuration allows the infant to be substantially shielded from insects or light weather elements, such as wind, UVA/UVB rays or light rain. The seat cover 10 must comprises at least one structural reinforcement element in order to retain a domelike shape. Typically, the structural reinforcement elements are embodied as rod, spindle, plastic lath or camber inducers. The structural reinforcement elements create a domelike shape as the single layer does not provide any shape memory structure. Typically, a structural reinforcement element is inserted within tubes attached to the cover seat 10 layer such as within stitching 32 (see FIGS. 4 and 5) of the top portion 34.

In another further hot temperature embodiment, the single layer of the infant seat cover 10 may be coated with a water-repellent solution or substance. The coating must be applied after the layer is dyed.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A protecting cover for use with an infant seat, the cover comprising:
   a) a multi-layer body portion having a dome shape configuration comprising:
      i) an opening, wherein the opening is configured to be located over a normal position of an infant when seated in the infant seat;
      ii) at least two body flaps formed in a region below the opening, wherein each body flap comprises a body flap edge having a locking mechanism allowing the at least two body flaps to be closed;
   b) a cover edge located on a bottom portion of the body portion, wherein the cover edge allows a fixation of the cover onto the infant seat;
   whereby the cover may be put into place over an infant seat when the seat is secured in place on a support surface; and
   whereby an infant may be placed into or removed from the infant seat when the cover is in place thereon, without having to remove the cover from the infant seat.

2. The protecting cover for an infant seat as claimed in claim 1, wherein an insulating material of at least one of the layers is made with semi-rigid insulating polyester fibres having a thickness of at least $3/8$ inch, wherein the insulating material at least partially maintains a central portion of the cover above a surface defined by at least one seat edge of the periphery of the infant seat.

3. The protecting cover for an infant seat as claimed in claim 1, wherein the multi-layer body portion is held by a plurality of stitchings transversely disposed from side to side, wherein the plurality of stitchings cover at least a substantial portion of the width of one of the body flaps and wherein the plurality of stitchings at least partially maintain a central portion of the cover above a surface defined by at least one seat edge of the periphery of the infant seat.

4. The protecting cover for an infant seat as claimed in claim 1, wherein the dome shape of the cover is configured to retain warm air under the cover and allows air circulation through the opening.

5. The protecting cover for an infant seat as claimed in claim 4, further comprising a securing mechanism allowing a side portions of the cover to be secured onto the infant seat.

6. The protecting cover for an infant seat as claimed in claim 5, wherein the locking mechanism of the body flaps is chosen from a group consisting of zippers, hook and loop fasteners, fasteners, snap fasteners, and buttons.

7. The protecting cover for an infant seat as claimed in claim 5, wherein the securing mechanism is chosen from a group consisting of an elasticized hem, a drawstring hem, at least a pair of ties adapted to extend under an infant car seat, at least a pair of elasticized loops adapted to extend under an infant car seat, and mixtures thereof.

8. The protecting cover for an infant seat as claimed in claim 7, wherein the multi-layer body portion comprises insulation material made with non-flammable and flame-proof material.

9. The protecting cover for an infant seat as claimed in claim 8, wherein the insulation material of at least one of the layers is chosen from a group consisting of polyester, cotton, quilted cotton, flannel, quilted flannel, nylon, quilted nylon, synthetic fabrics, wool, foam and mixtures thereof.

10. The protecting cover for an infant seat as claimed in claim 9, wherein the infant seat is an infant car seat.

11. A protecting cover for an infant seat, as claimed in claim 10, wherein the insulating material of at least one of the layers further comprises fiber fills insulation fabric.

12. The protecting cover for an infant seat as claimed in claim 10, wherein the insulating material of at least one of the layers further comprises polyester micro-fleece material.

13. The protecting cover for an infant seat as claimed in claim 10, wherein the insulating material of at least one of the layers further comprises a layer more than half an inch thick of polyester.

14. A protecting cover for use with an infant seat having at least one seat edge formed by the periphery of the infant seat, the protecting cover having light insulation and comprising:

a) a multi-layer body portion held by stitching having:
   i) an opening, wherein the opening is configured to be located over a normal position of an infant when seated in the infant seat;
   ii) at least two body flaps formed in a region below the opening, wherein each body flap comprises a body flap edge having a locking mechanism allowing the at least two body flaps to be closed;
   iii) at least one structural reinforcement element;
b) a cover edge located on the bottom portion of the body portion, wherein the cover edge retains the cover onto the infant seat;
wherein the reinforcement element is substantially inserted within the stitching for maintaining a central portion of the cover above the surface defined by the at least one infant seat edge when used with an infant seat;
whereby the cover may be put into place over an infant seat when the seat is secured in place on a support surface; and
whereby an infant may be placed into or removed from an infant seat when the cover is in place thereon, without having to remove the cover away from the infant seat.

15. The protecting cover for an infant seat as claimed in claim 14, wherein the central portion of the cover is configured to retain warm air under the cover and allows air circulation through the opening.

16. The protecting cover for an infant seat as claimed in claim 15, wherein the multi-layer body portion comprises insulation material made with non-flammable and flame-proof material.

17. The protecting cover for an infant seat as claimed in claim 16, wherein the insulation material of at least one of the layers is chosen from the group consisting of polyester, cotton, quilted cotton, flannel, quilted flannel, nylon, quilted nylon, synthetic fabrics, wool, foam and mixtures thereof.

18. The protecting cover for an infant seat as claimed in claim 17 wherein the locking mechanism is chosen from the group consisting of zippers, hook and loop fasteners, fasteners, snap fasteners, and buttons.

19. A protecting cover for use with an infant seat having at least one seat edge formed by the periphery of the infant seat, the protecting cover comprising:
a) a body portion having:
   i) at least one layer made from breathable material;
   ii) at least two body flaps formed in a region over a normal position of an infant when seated in the infant seat, wherein each body flap comprises a body flap edge having a locking mechanism allowing the at least two body flaps to be closed;
   iii) at least one structural reinforcement element, wherein the reinforcement element is substantially fixed by stitching to a screen layer;
b) a cover edge located on a bottom portion of the body portion, wherein the cover edge allow fixation of the cover onto the infant seat;
wherein the reinforcement element is substantially inserted within the stitching thereby maintaining a central portion of the cover above a surface defined by the at least one seat edge;
whereby the cover may be put into place over an infant seat when the seat is secured in place on a support surface; and
whereby an infant may be placed into or removed from an infant seat when the cover is in place thereon, without having to remove the cover away from the infant seat.

20. A protecting cover for an infant seat as claimed in claim 19, wherein the at least one layer is made with screen material.

21. A protecting cover for an infant seat as claimed in claim 20, wherein the at least one layer is coated with water-repellent coating.

22. A protecting cover for an infant seat as claimed in claim 21, wherein the at least one layer is configured to repel water and protect against light wind, UV rays and insects.

* * * * *